US005634650A

United States Patent [19]

[11] Patent Number: 5,634,650
[45] Date of Patent: Jun. 3, 1997

Hensler, Sr. et al.

[54] RECREATIONAL WHEELCHAIR

[75] Inventors: Mike Hensler, Sr., Daytona Beach; Roger Shulzinsky, S. Daytona Beach, both of Fla.

[73] Assignee: Surf Chair, Inc., Daytona Beach, Fla.

[21] Appl. No.: 309,518

[22] Filed: Sep. 20, 1994

Related U.S. Application Data

[63] Continuation of Ser. No. 5,195, Jan. 11, 1993, abandoned, which is a continuation of Ser. No. 738,954, Aug. 1, 1991, abandoned.

[51] Int. Cl.$^6$ .......... B62B 7/04

[52] U.S. Cl. .......... 280/47.38; 280/250.1; 280/304.1; 297/DIG. 4

[58] Field of Search .......... 280/47.38, 250.1, 280/304.1; 297/DIG. 4; 180/907

[56] References Cited

U.S. PATENT DOCUMENTS

| | | | |
|---|---|---|---|
| D. 294,811 | 3/1988 | Rice et al. | D12/131 |
| 3,173,396 | 3/1965 | Bradov | 280/47.38 |
| 4,077,483 | 3/1978 | Randolph | 180/6.5 |
| 4,268,054 | 5/1981 | Twitchell et al. | |
| 4,500,102 | 2/1985 | Haury et al. | |
| 4,592,570 | 6/1986 | Nassiri | 297/DIG. 4 |
| 4,598,921 | 7/1986 | Fenwick | |
| 4,641,850 | 2/1987 | Rice et al. | |
| 4,674,584 | 6/1987 | Watkins | |
| 4,712,803 | 12/1987 | Garcia | 280/652 |
| 4,741,547 | 5/1988 | Tholkes | 280/250.1 |
| 4,744,324 | 5/1988 | Martinmaas | 440/90 |
| 4,770,432 | 9/1988 | Wagner | 280/250.1 |
| 4,892,323 | 1/1990 | Oxford | |
| 4,926,777 | 5/1990 | Davis, Jr. | 280/250.1 |
| 4,984,813 | 1/1991 | Takahashi et al. | 297/DIG. 4 |
| 5,020,818 | 6/1991 | Oxford | 280/250.1 |
| 5,149,118 | 9/1992 | Oxford | 280/250.1 |
| 5,176,393 | 1/1993 | Robertson et al. | 180/907 |

FOREIGN PATENT DOCUMENTS

| | | | |
|---|---|---|---|
| 2423212 | 12/1979 | France | 297/DIG. 4 |

*Primary Examiner*—Eric D. Culbreth
*Attorney, Agent, or Firm*—Bradford E. Kile; Ruffin B. Cordell; Michael J. McKeon

[57] ABSTRACT

A recreational wheelchair having four oversized low pressure tires for use on beaches, lakeshores or other soft or rough terrain environments. The structural members of the chair are made of rugged and corrosion resistant materials such as polyvinyl chloride, stainless steel or aluminum and the chair is designed to be submerged into water of limited depths. The chair includes a high strength box chassis, removable armrest and accessories for recreation such as an umbrella bracket, fishing rod holder, and oxygen tank mounting.

8 Claims, 3 Drawing Sheets

RECREATIONAL WHEELCHAIR

This application is a continuation, of application Ser. No. 08/005,195, now abandoned filed Jan. 11, 1993, which is a continuation of Ser. No. 07/738,954, filed Aug. 1, 1991 now abandoned.

BACKGROUND PRIOR ART

This invention relates to a novel wheelchair device. The wheelchair of this invention is particularly, although not exclusively, adapted for recreational purposes, including applications allowing the user to be transported across soft uneven surfaces such as a sandy beach or muddy lake shore and further to be transported into water of limited depths. The construction of this wheelchair is particularly adapted for these purposes utilizing corrosion resistant materials and wheel structures adapted to travel over soft, uneven surfaces.

At present, most wheelchairs are designed to transport occupants across paved surfaces such as hospital hallways or other indoor environments. As a result, these chairs are designed with low friction bearings and large diameter, thin tubular rim wheels to offer the least resistance when transporting an occupant across such surfaces. The chairs are constructed of high quality, high strength stainless steel or other similar materials. Such wheelchairs typically cost in the range of $3,000 to $5,000 and are intended to have useful lifetimes on the order of ten years. In addition, conventional wheelchairs are provided with elaborate mechanisms to allow for folding and collapsing of the wheelchair for transportation and storage. These elaborate mechanisms are subject to corrosion when exposed to outdoor environments and must be maintained diligently to avoid rusting and deterioration of moving parts.

The front wheels of conventional wheelchairs typically take the form of small casters which may swivel about a vertical axis to permit ease of steering and self-propulsion of the chair by the occupant. Such wheels are of small diameter and narrow width to facilitate swiveling.

Because of the high quality bearings and materials that are utilized in conventional wheelchairs, they have been, in general, unacceptable for use in outdoor applications. Specifically, the corrosive nature of outdoor elements such as seawater, sand, solar radiation and debris found in recreational environments make prior wheelchair designs unacceptable. The materials chosen are not suited for long term exposure to sun and sand, etc.. Further, the narrow tires used on conventional wheelchairs to reduce rolling resistance do not permit travel over soft surfaces such as sand, mud, or uneven terrain. It is an object of the present invention to provide an ambulatory vehicle or wheelchair which overcomes these and other limitations of prior devices.

Conventional wheelchairs have at times in the past been constructed of non-metallic materials to avoid causing interference in instruments such as nuclear magnetic resonance imaging devices. Such wheelchairs are represented in U.S. Pat. No. 4,770,432 to Wagner wherein is disclosed a conventional wheelchair partially constructed of non-metallic materials. Such wheelchairs are of completely conventional design but for the choice of construction materials and thus retain the disadvantages of conventional wheelchairs with regard to recreational activities.

The tire construction utilized in Wagner, for example, prevents use on uneven or soft surfaces. In addition, the non-metallic materials chosen appear to be custom molded of rigid skinned polyurethane. The wheelchair parts are affixed utilizing nonmagnetic metals. The intricate mechanisms of Wagner are inappropriate for marine environments.

A prior art device directed toward providing a wheelchair for travel over uneven surfaces is disclosed in Randolph, U.S. Pat. 4,077,483. The Randolph device consists of a conventional wheelchair seat which has been provided a tank-like tractor arrangement rather than wheels. The device is further provided with an electric motor and control mechanism to allow the occupant to direct the chair. The device does not, however, accommodate soft surfaces such as dry sand or estuary shores and instead is directed toward inclined on stepped surfaces such as floors, sidewalks or entering or exiting a vehicle.

One example of a prior art attempt to produce a wheelchair suitable for use and recreational contexts is disclosed in Rice et. al., U.S. Pat. No. Des. 294,811. The Rice disclosure sets forth a basic wheelchair design having two oversized rear wheels of exaggerated thickness much like wagon wheels. The wheelchair shown in Rice is an attempt to provide rear wheels which have some capability for travelling over soft or uneven surfaces. The front wheels of the Rice wheelchair had been removed and instead have been replaced with simple post supports. The lack of front wheels in the Rice design renders it ineffective for use with invalids of significant weight or incapacity. The Rice design must be moved in an inclined position at all times rendering it difficult to manage for the attendant.

A still further example of prior art devices which attempts to provide a wheelchair in recreational contexts is set forth in the French Patent document No. 2,423,212 issued to Escande. The Escande device discloses a conventional wheelchair provided with larger rear tires. The Escande device suffers from the lack of any provision of soft terrain means in the front of the device. This device must be moved over soft terrain in an inclined position producing difficulty for both chair occupant and attendant.

As will be understood, the wheelchair of this invention overcomes many of the disadvantages of prior art. The difficulties and limitations suggested in the preceding are not intended to be exhaustive but rather are among many which may tend to reduce the effectiveness and user satisfaction with prior recreational wheelchairs and the like. Other noteworthy problems may also exist; however, those presented above should be sufficient to demonstrate that prior recreational wheelchairs appearing in the past will admit to worthwhile improvement.

SUMMARY OF THE INVENTION

In contrast to the prior art devices which have attempted to address the need for a recreational and aquatic wheelchair, the present invention is particularly although not exclusively adapted for use in transporting invalids and other wheelchair bound patients over rough or soft surfaces and into water of limited depths in recreational contexts. In the preferred embodiment, the present invention consists of an all plastic wheelchair structure having a seat, frame members, transporting handles, and wheel base chassis together with four oversized low pressure wheels. The wheelchair of this invention is rugged and corrosion resistant while weighing approximately half as much as a standard wheelchair. A primary advantage of this invention is its ability to transport an invalid or other wheelchair bound person over soft surfaces, such as a sandy beach or muddy lake shore while resisting the corrosive elements normally associated with recreational environments. A further advantage of the present invention is its high strength, lightweight design which makes it ideal for transporting to and from recreational sites while accommodating a full range of users. A still further advantage of the present invention is its ability to adapt to a variety of auxiliary features which are both desirable and in some cases required for certain patients or invalids to participate in recreational activities. Such auxiliary features include an umbrella stand, oxygen rack, fishing rod holder, food and beverage container, storage pouch, drink and food tray, and restraints for chest and legs.

The recreational wheelchair of this invention is advantageously constructed of conventional polyvinyl chloride ("PVC") frame members consisting of straight lengths of PVC tubing and a variety of standard PVC joining members. The frame is arranged in a way to provide maximum strength and support while avoiding needless costs and added weight to the device. The wheel supports and chassis are also constructed of PVC materials and, again, provide a high strength, lightweight design. PVC provides an ideal material for marine environments. The wheels themselves are oversized low pressure inflatable tires which provide an overall surface area between the tire and the surface of the ground of at least 35 square inches per tire with a 200 lb. occupant.

The seat material is high strength nylon webbing which is looped over respective frame members in a conventional seat and back design. The high strength nylon webbing arrangement of the present invention lends strength to the device and adds overall stability to the wheelchair itself.

Each of the auxiliary features of the recreational wheelchair of the present invention are attached to the wheelchair frame itself using conventional attachment means such as U-brackets. A removable footrest is provided for the comfort and safety of the occupant and again is constructed of a plastic or stainless steel frame and nylon webbing for high strength and anticorrosion purposes.

OBJECTS OF THE INVENTION

It is therefore a general object of the invention to provide a novel recreational wheelchair or the like which will obviate or minimize the problems previously described with reference to the prior art.

It is a specific object of the invention to provide a novel recreational wheelchair which will be highly rugged yet light in weight and capable of resisting corrosion in a wide range of recreational environments.

It is another object of the invention to provide a novel recreational wheelchair which may be advantageously used to transport an invalid or other patient across an uneven surface.

It is still another object of the invention to provide a recreational wheelchair which may be used to transport an invalid or other patient over soft surfaces such as sand or the muddy surface of a lake shore or river bed.

It is a related object of the invention to provide a novel recreational wheelchair which will provide easy locomotion through the efforts of an assisting attendant.

It is a still further object of the invention to provide a novel recreational wheelchair which will be operable to distribute load bearing forces over a wider surface area while concomitantly decreasing the effort required to move the chair.

It is a still further object of the invention to provide a novel recreational wheelchair wherein the supporting structure and design is of a high strength character.

It is a still further object of the invention to provide a recreational wheelchair with a novel debris-resistant wheel chassis and support.

Other advantages and meritorious features of the present invention will be understood from the following description of the preferred embodiments, the appended claims, and the drawings, the brief description of which follows.

DETAILED DESCRIPTION OF THE INVENTION

Figure 1:
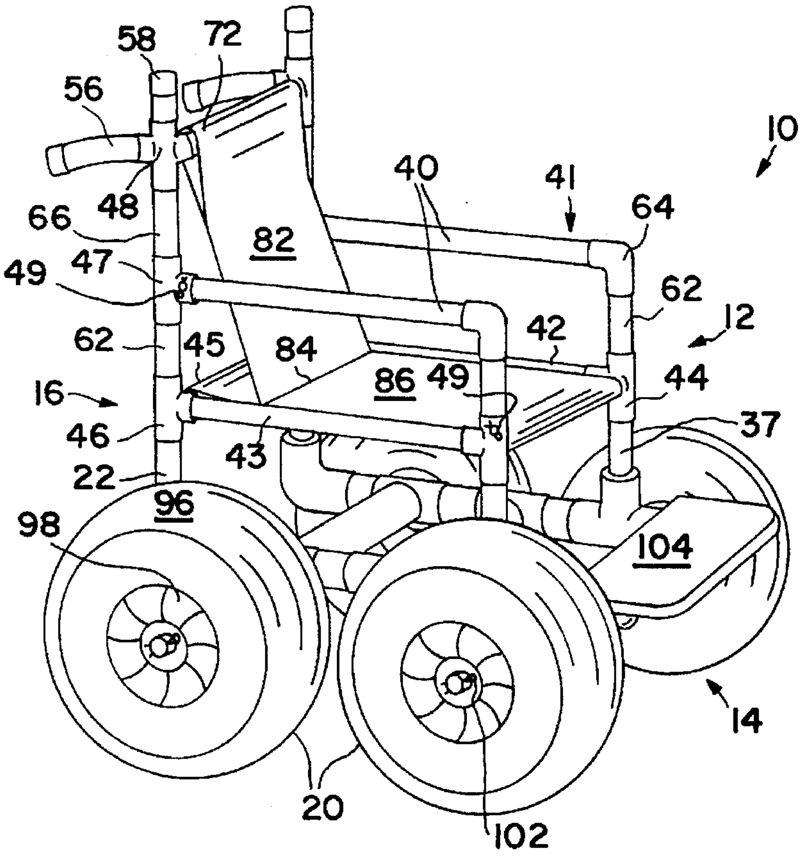
FIG. 1 is a prospective view of the recreational wheelchair of the present invention.
Figure 2:
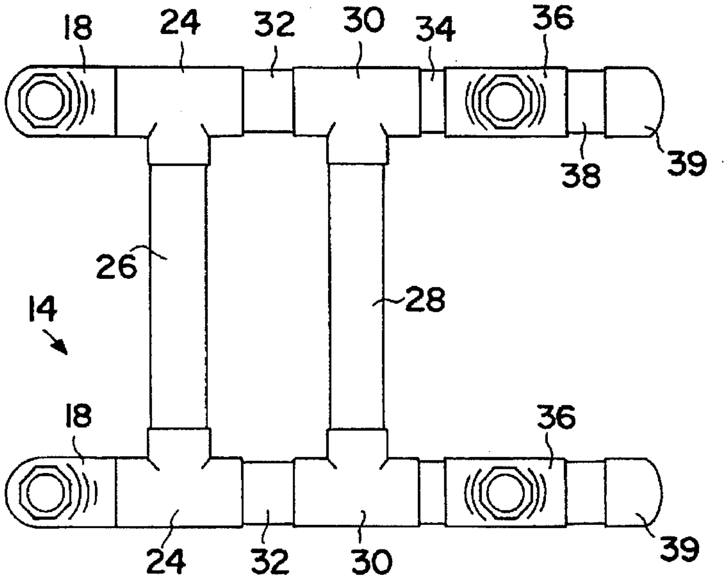
FIG. 2 is a plan view of the support chassis of the recreational wheelchair of the present invention.

Referring to FIGS. 1 and 2, the recreational wheelchair of the present invention is shown to include a chair frame structure 12 together with a wheel chassis 14 and wheels 20.

Chair structure 12 is integrally connected to wheel chassis 14. Wheels 20 are attached to wheel chassis 14 through axles 92.

Chair structure 12 consists of front and back seat frame members 44 and 45 and right and left side seat frame members 42 and 43. Seat frame members 42–45 consist of lengths of PVC tubing of approximate diameter of 1 and ¼ inches. The seat members 42–45 are joined into a rectangular arrangement wherein side members 42 and 43 are approximately 1 and ½ times as long as front and back members 44 and 45. A nominal length for seat members 42 and 44 is 16 and 24 inches, respectively. It will be understood that other lengths may be used depending upon the size of the intended chair occupant. Seat members 42, 43, 44 and 45 are joined into this rectangular arrangement utilizing PVC four-way members 46. Each connection on recreational wheelchair 10 is formed utilizing conventional PVC primer and cement except where specified. Such connections typically are stronger than the PVC tubing itself and rarely fail. Each of the four-way PVC joint members 46 is placed at a corner of a seat frame 16. The L portion of joint members 46 is used to join adjacent sides of seat frames 16 to form an integral, high strength rectangular seat frame.

Seat frame 16 is then provided with 4 upright frame members 62. At the top of the front upright frame members 62 there is provided a PVC elbow joint 64 which adjoins frontmost upright members 62 to armrests 40. Front upright members 62 together with arm rest members 40 constitute removable armrest assembly 41. Removable armrest assembly 41 may be removed to facilitate movement of the occupant into and out of chair 10. The joints between front upright members 62 and front four-way PVC joint members 46 are not fixed using cement. Instead, holes are drilled through corresponding portions of the lower portion of front members 62 and through front joints 46 to accommodate a pin fastener 49.

Rear upright members 62 are provided with an additional threeway PVC joint 47 at their upper ends. As in the case of the lower connection of armrest assembly 41, the rearmost end of armrests 40 are removably attached to joint members 47 by use of through holes and a fastening pin 49. Four-way PVC joint 47 is then connected to both horizontal arm rests 40 and an additional upright 66. At the upper end of upright 66 is provided a still further four-way PVC joint 48. The upper most end of upper PVC joint 48 is provided with a removable cap 58 to allow attachment of further apparatus such as a head rest, umbrella, or other special equipment. Cap 58 also prevents injury from the sharp edges of the PVC tubing.

The rearmost portion of PVC joint 48 is provided with handle members 56 to allow an attendant to push the recreational wheelchair and easily maneuver around obstacles. Handles 56 also provide a basis for steadying the wheelchair 10 during ingress or egress of the occupant. The interior ports of PVC joints 48 are connected to upper back frame member 72. Upper back frame member 72 provides the uppermost support for the occupant's back. The innermost ports of PVC joints 46 are provided with lower rear seat member 45. Taken together, members 72, 45, 62, and 66 together with PVC joints 48, 47 and 46 provide a second box-like structure to lend the chair 10 structural stability.

The seat provided for recreational wheelchair 10 of the present invention consists of high strength nylon netting of an open-weave Texilene fabric or similar material which is unaffected by sun, salt water or other elements and dries quickly. Seat back 82 consists of a length of Texilene fabric approximately 22 inches in width which is looped over upper seat back member 72 and sewed in a closed loop arrangement along seam84. Seat bottom 86 further consists of a loop of Texilene fabric also 22 inches in width which is looped about front seat frame member 44 and rear seat frame member 45 in a continuous loop arrangement. Seat back member 82 and seat bottom member 86 are joined at seam 84 in a closely knit fashion. Seam 84 is positioned several inches from rear seat member 45 providing a natural seat supporting surface for the user. The looping arrangement of seat members 82 and 86 advantageously improves the strength and stability of the overall device. When a user sits in recreational wheelchair 10, tension is introduced into seat members 82 and 86. This tension provides a stabilizing force to upper frame member 72 and seat members 44 and 45 and tends to counter the moment introduced by the downward pressure of the attendant on handles 56. This results in an improvement in the overall strength and stability of the chair itself.

Referring now to FIG. 2, which sets forth the base chassis of wheelchair 10, the chassis 14 is constructed of PVC tubing of a diameter of 2 and ½ inches. The chassis is constructed of a basic box design to promote overall stability and strength of the device. Wheel chassis 14 consists of two upright turned elbows 18 which communicate directly with the rear of seat frame structure 12 through upright members 22. Elbow members 18 are, in turn, connected to PVC "T" connections 24. Between left and right T connection members 24 is provided first cross member 26. The front ends of T connections 24 are provided with first horizontal support members 32. Support members 32 connect first T connection 24 with second T connections 30 in an end-to-end relation. Provided between second T connections 30 is second cross member 28. At the frontmost portion of T connections 30 is provided second horizontal support members 34. Support members 34 connect second T connections 30 to upright T connection 36. The upper portion of T connection 36 is provided with second upright connection member 37 which communicates the front of chassis frame 14 with the front of seat frame 12. Finally, the frontmost portion of beam members 36 is provided with third horizontal support members 38 and end caps 39. End cap 39 prevent the sharp edges normally associated with PVC tubing from injuring occupants, attendants or bystanders.

Figure 3:
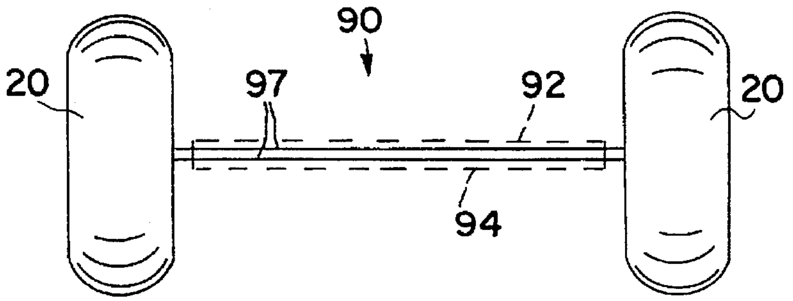
FIG. 3 is a front view of the wheel and axle assembly of the recreational wheelchair of the present invention.

Within cross member 26 a hollow space is provided which is adapted to receive the tubular axle structure 90 of FIG. 3. Axle structure 90 consists of two oversized wheels 20 related by an axle rod 92. Axle rod 92 is further provided with an outer axle sheath member 94 which reduces friction between axle member 92 and the surrounding parts of recreational wheelchair 10 and generally protects axle 92 from corrosion. Axle members 92 are advantageously constructed of 1 inch stainless steel or aluminum thick wall tubing. Axle sheath 94 (shown in phantom) is formed of a single length of PVC tubing of approximately ¼ inch larger diameter than axle rod 92.

Wheel members 20 consist of an inflatable tire 96 and tire rim 98. Axle member 92 is connected to tire rim 98 through the use of a linchpin or other fastener 102. Wheel and axle assembly 90 is identical for both front and rear axles of recreational wheel chair 10.

In mounting rear axle assembly 90 to the wheel chassis of FIG. 2, holes are drilled in T connections 24 in alignment with the hollow space of cross-members 26 providing a through access from one side of chassis 18 to the other through cross-members 26. Axle rod 92 is then placed within axle sheath 94 forming axle assembly 97. Subsequently, axle rod assembly 97 is guided through the holes drilled in T connections 24 as well as through crossmember 26. Once axle assembly 97 is through chassis 14, wheels 20 are mounted to axle 92 through the use of linchpins 102.

Front axle assembly 90 is mounted by drilling aligned holes through T connections 36. Axle assembly 97 is then guided through right and left T connections 36. Wheels 20 are then mounted to axle 92 using linchpins 102.

The resulting design is one which avoids contaminants and resists corrosion of the harsh environment normally associated with recreational uses while providing a minimum of friction against motion of the chair. The reduced number of moving parts in the axle and wheel assembly of the present invention produces a design which is highly resistant to corrosion and the deposition of foreign matter within the axle mechanism. As a result, the axle mechanism of the present invention is highly suited for recreational applications, avoids debris entrapment, and will achieve long-term functionality with little maintenance. Removal or replacement of tires consists of removing the linchpin 102 and sliding wheel 20 off. Axles can be removed in this way also. In addition, conventional spacers may be used to reduce lateral wheel movement.

Figure 4:
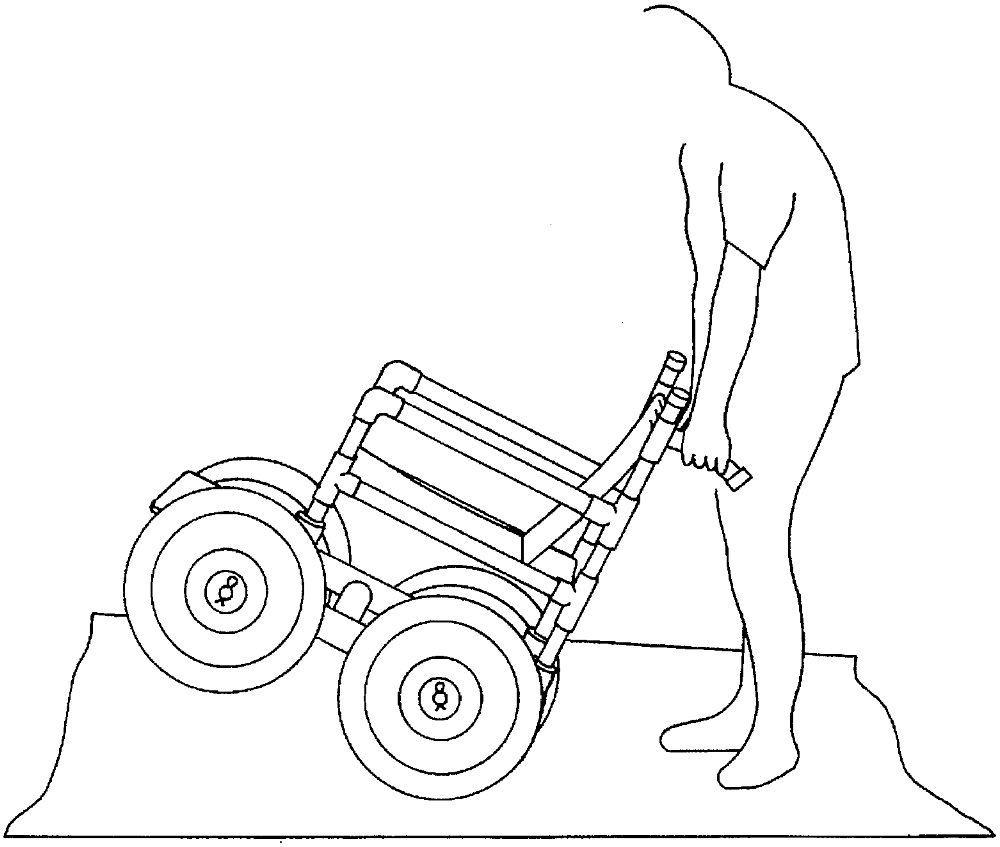
FIG. 4 is a side view of the recreational wheelchair of the present invention in a reclined position.

Because the wheelchair of the present invention is not provided with steerable front wheels, to alter the direction of travel the chair is inclined onto its rear wheels. This process is illustrated in FIG. 4 where an attendant inclines wheelchair 10 to allow easy rotation of the chair about a vertical axis. In this manner, only momentary inclination of the chair is necessary to adjust the direction of travel. Further movement resumes with all four wheels in contact with the ground.

The recreational wheelchair of the present invention is provided with a removable foot rest 104. Footrest 104 may be utilized in its fully extended position as shown in FIG. 1 or alternatively, may be retracted under the seat structure 12 to facilitate entry and exit of the user to and from the chair or removed entirely. Footrest 104 is constructed of Texilene fabric looped around a PVC or aluminum frame. Footrest 104 is mounted in a sliding engagement to T connections 36 and end caps 39. Footrest 104 is provided with securing strap (not shown) by a The wheels 20 of the present invention are of a novel and unique arrangement. Rear wheels of standard wheelchairs are of larger diameter so that the occupant can provide locomotion. The width of standard wheelchairs is limited by a complex set of specifications intended to ensure access for the handicapped to public buildings and the like. Because the wheelchair of the present invention is not intended to be used as a primary wheelchair, it does not meet the special size specifications for conventional wheelchairs. The wheelchair of the present invention however, is intended for recreational purposes and is thus designed for that purpose.

The tires of the present invention are low pressure, wide tires having a diameter of approximately 12 to 14 inches and width of 4 to 8 inches. The tires are constructed to promote ease of transportation over soft surfaces such as sand or a soft river or lake bank. A primary feature of the tires of the present invention is the ability to distribute the weight of the chair and occupant over a large surface area. Each tire of the present invention is designed to contact the surface of the ground being travelled upon by no less than about 35 square inches per wheel with a 200 lb. occupant. The net result of this large contact area is that the weight of the chair and occupant is distributed over a large surface area and thus the wheels do not sink into soft surfaces such as sand and mud.

When attempting to cross sandy beaches, for example, conventional wheelchair wheels sink into the sand and become immobile. This is especially important with respect to the front wheels. In conventional wheelchairs, the front wheels are small and narrow and are unable to negotiate soft surfaces. The present invention represents a significant opportunity to enhance the recreation possibilities of the handicapped.

The preferred embodiment of the present invention utilizes PVC as its primary construction material. PVC is ideally suited as a low cost, lightweight, high strength material which withstands the stresses of marine and aquatic environments. The PVC tubing and joints resist deterioration due to exposure to sunlight, seawater, sand, and other elements.

It is also contemplated that the seat structure 12 and chassis 14 of the recreational wheelchair of the present invention may be alternatively constructed of thin wall aluminum tubing following the same basic design as is set forth above. Still further, the seat structure 12 and chassis 14 of the recreational wheelchair of the present invention may be heat molded of lengths of PVC tubing utilizing apparatus designed for producing seamless bends in PVC tubing.

Figure 5:
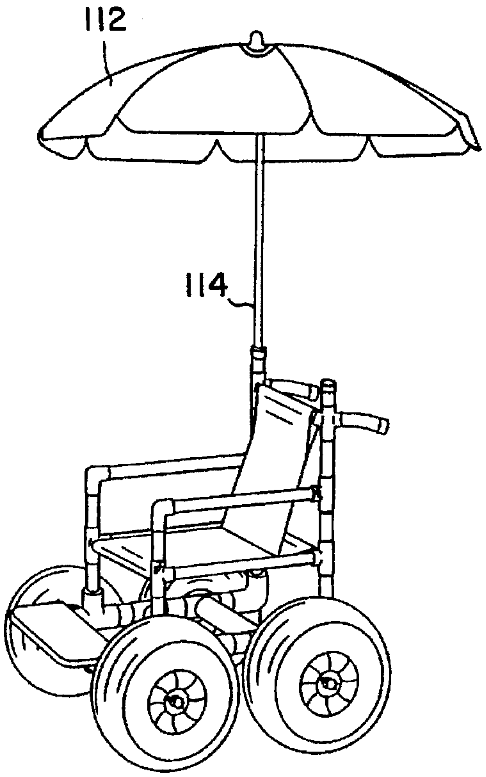
FIG. 5 is a perspective view of the recreational wheelchair of the present invention with an attached umbrella accessory.

The recreational wheelchair of the present invention may also be advantageously provided with a variety of accessories. The first accessory is shown in FIG. 5 wherein a shading umbrella 112 is provided with a mounting on the wheelchair itself. Upper end cap 58 is removed from the wheelchair structure and instead a conventional threaded locking nut with O-ring (not shown) is installed. The supporting staff 114 of the shading umbrella 112 is placed down into the locking apparatus itself. Because the structure of the present invention provides a continuous hollow space through each of the upright portions of the rear of chair frame 12, there is ample space to accommodate the staff 114 of umbrella 112. The threaded locking nut 116 with rubber O-ring prevents umbrella 112 from blowing out in high winds.

Figure 6:
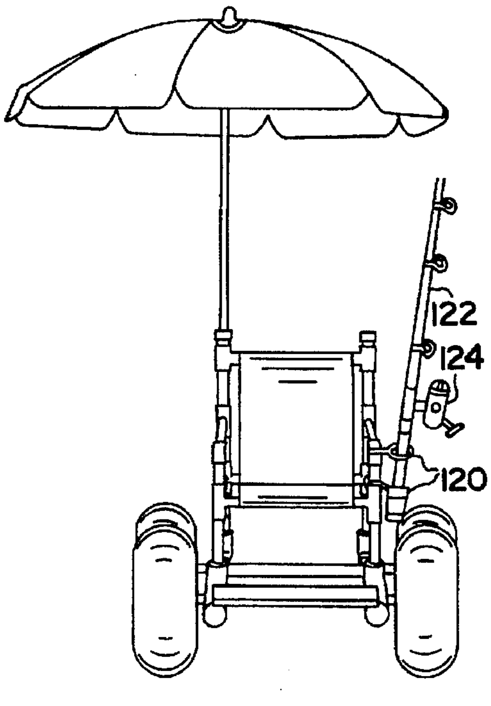
FIG. 6 is a front view of the recreational wheelchair of the present invention with an attached fishing rod holder.

The wheel chair of the present invention is further provided with an accessory in the form of a fishing rod holder armrest 120 as shown in FIG. 6. Fishing rod holder armrest 120 is attached where regular armrest 64 has been removed by sliding it into open PVC fittings 46 and 47 in a manner to permit the occupant to easily reach the fishing rod 122 and operate an attached reel 124. Fishing rod holder armrest 120 can be easily installed on either side so that occupant can operate reel 124 with a functioning hand. This accessory restores the pleasure of fishing to many whose freedom and leisure time activities have been limited by an accident or illness.

For those patients who require ongoing oxygen therapy, the wheelchair of the present invention is provided with an oxygen tank bracket accessory. The oxygen tank bracket is mounted to the rear of upper back member 72 and to rear seat member 44 to provide a stable platform onto which an oxygen tank may be mounted. Such oxygen tank bracket with an accompanying oxygen tank allows those patients whose outside activities must be conducted with the assistance of oxygen to again enjoy the outdoors. Further accessories may include a food and beverage container, storage pouch, drink and food tray, and restraints for chest and legs.

In use, recreational wheelchair 10 provides a rugged and versatile vehicle for wheelchair bound people. The wheelchair 10 may be used along the sea shore, lake front, or outdoor trails and gardens. The chair may be wheeled into water of limited depths.

Further, the chair may be used in swimming pools other controlled environments in water of greater depths.

The recreational wheelchair of the present invention is adapted to be used in marine environments and includes chair frame means for supporting an occupant made predominantly of synthetic materials suitable for exposure to marine environments;seat means for supporting an occupant in said frame means, wherein said seat means is made predominantly of synthetic fabric materials resistant to mildew; wheel means; axle means for supporting said wheel means in a rolling arrangement wherein said axle means is made predominantly of metal materials suitable for exposure to marine environments; and a support chassis for supporting said chair frame means over said axle means wherein said chassis means is made predominantly of synthetic materials suitable for exposure to marine environments.

It should be appreciated that there has been disclosed in accordance with the present invention, the preferred embodiment of the recreational wheelchair of the present invention. It is evident that many alternatives, common modifications, and variations would be apparent to one of ordinary skill in the art in light of the description set forth herein. Accordingly, the present invention is intended to embrace all such alternatives, modifications, and variations that fall within the spirit and broad scope of the following appended claims.

We claim:

1. A recreational wheelchair adapted to be used in marine environments comprising:

a chair frame for supporting an occupant comprising a plurality of tubular members joined together so as to define said chair frame, said plurality of tubular members formed from predominantly synthetic materials suitable for exposure to marine environments;

a handle for providing a motive force to said wheelchair through the assistance of an attendant, said handle secured to an upper portion of said chair frame;

a seat for supporting an occupant;

at least four wheels;

front and rear axles mounted to and supporting said wheels in a rolling arrangement wherein said front and rear axles are made predominantly of materials suitable for exposure to marine environments;

a chassis for supporting said chair frame over said front and rear axles comprising a plurality of tubular members joined together so as to define said chassis, said plurality of tubular members formed from predominantly synthetic materials suitable for exposure to marine environments;

at least four tires disposed about said wheels for distributing the weight of said wheelchair and occupant over a large surface area, two of said tires disposed on wheels fixed to said front axle, and two of said tires disposed on wheels fixed to said rear axle, each of said tires having a width of at least four inches.

2. The recreational wheelchair of claim 1, wherein said plurality of tubular members of said chair frame and said chassis are formed from plastic.

3. The recreational wheelchair of claim 1, wherein said plurality of tubular members of said chair frame and chassis are formed of polyvinyl chloride.

4. The recreational wheelchair of claim 1, wherein said seat is formed predominantly of nylon fabric materials resistant to mildew.

5. The recreational wheelchair of claim 1, wherein said plurality of tubular members forming said chair frame and said chair chassis are joined by tubular joint members which are formed to receive respective ends of said plurality of tubular members.

6. The recreational wheelchair of claim 1, wherein said chair frame includes:

a seat frame;

a back frame;

a first armrest fixedly connected to both of said seat frame and said back frame; and a second armrest removably connected to both of said seat frame and said back frame to permit removal of said second arm rest to facilitate entry and egress of said occupant.

7. The recreational wheelchair of claim 6, wherein said second armrest includes means for supporting a fishing rod.

8. The recreational wheelchair of claim 6, wherein said back frame includes means for supporting an umbrella.

* * * * *